March 2, 1965 H. DEIBELE 3,171,345
COFFEE MAKERS
Filed April 19, 1962 2 Sheets-Sheet 1
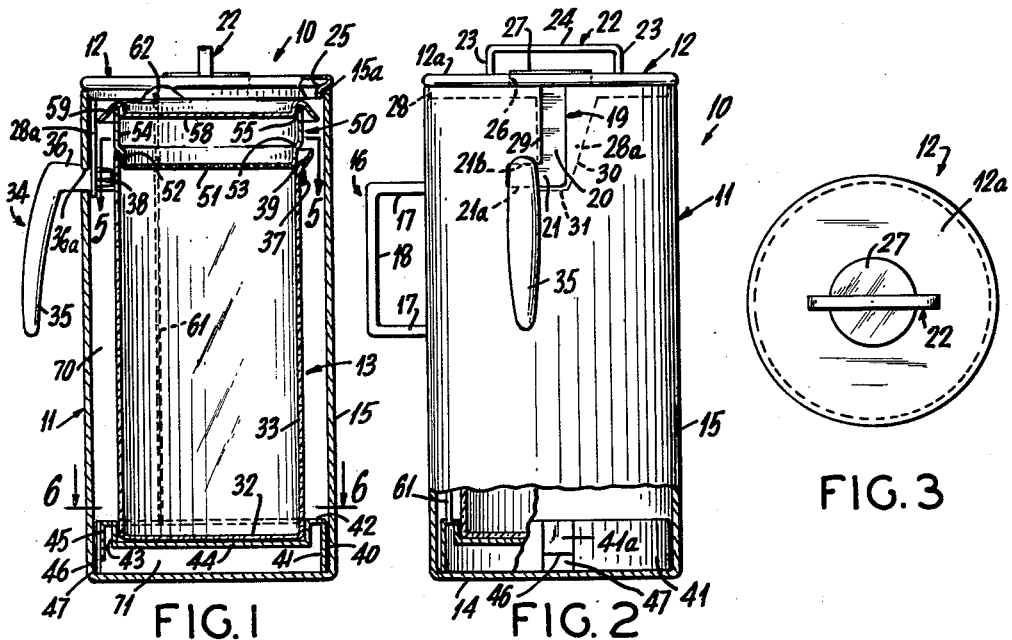
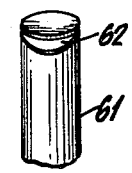
FIG.10
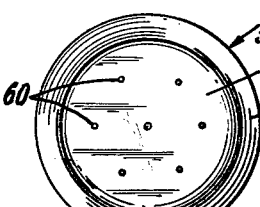
FIG.4
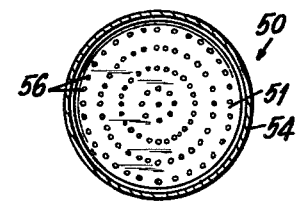
FIG.5
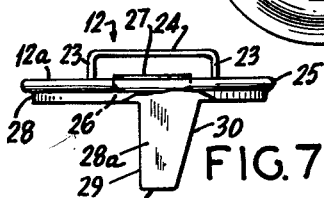
FIG.7
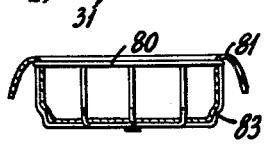
FIG.8
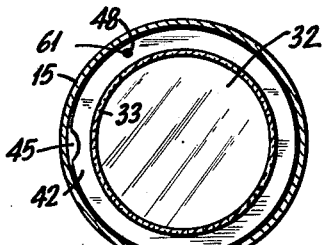
FIG.9
FIG.6
INVENTOR.
HANS DEIBELE
BY
J. B. Felshin
ATTORNEY.

March 2, 1965 H. DEIBELE 3,171,345
COFFEE MAKERS

Filed April 19, 1962 2 Sheets-Sheet 2

INVENTOR.
HANS DEIBELE
BY
*J.B.Feeohin*
ATTORNEY.

United States Patent Office 3,171,345
Patented Mar. 2, 1965

3,171,345
COFFEE MAKERS
Hans Deibele, 26—07 12th St., Astoria,
Long Island, N.Y.
Filed Apr. 19, 1962, Ser. No. 188,631
8 Claims. (Cl. 99—307)

This invention relates to coffee makers.

An object of this invention is to provide a coffee maker assembly having means for making either drip or filter coffee by letting the boiling water through a filter or drip cup to permit the brewed coffee to fall into a non-metallic vessel from which it can be served separately or as part of the coffee maker assembly.

Another object of this invention is to provide a coffee makers of the character described provided with means to keep the brewed coffee hot for a long period, and which is so constructed that the brewed coffee is not recirculated through the coffee grounds.

Another object of this invention is to provide a coffee maker of the character described which may be easily and simply disassembled for cleaning purposes.

Yet another object of this invention is to provide a strong and durable coffee maker of the character described, which shall be relatively inexpensive to manufacture, easy to operate, and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown an illustrative embodiment of this invention, FIG. 1 is an axial, vertical, cross-sectional view of a coffee maker embodying the invention;

FIG. 2 is a side elevational view of the coffee maker in a plane at right angle to the plane of FIG. 1;

FIG. 3 is a top plan view of the lid for the outer metal pot forming part of the coffee maker embodying the invention;

FIG. 4 is a top view of the cover for the coffee ground holding receptacle;

FIG. 5 is a cross-sectional view taken on line 5—5 of FIG. 1;

FIG. 6 is a cross-sectional view taken on line 6—6 of FIG. 1;

FIG. 7 is a side elevational view of the lid for the outer pot, with parts broken away and in cross section;

FIG. 8 is a modified form of coffee receptacle and employs a filter;

FIG. 9 is a top view of the form of coffee ground holding receptacle shown in FIG. 8;

FIG. 10 is a perspective view of the top portion of the pipe for boiling water;

Figure 11:
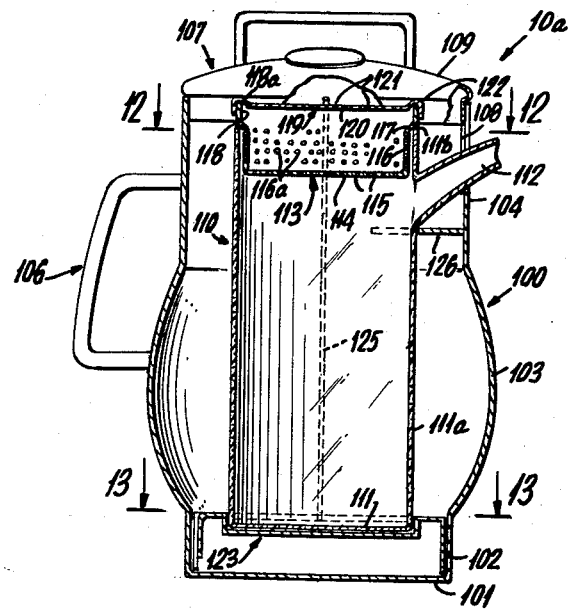
FIG. 11 is a vertical cross-sectional view of a modified construction of the coffee maker.
Figure 12:
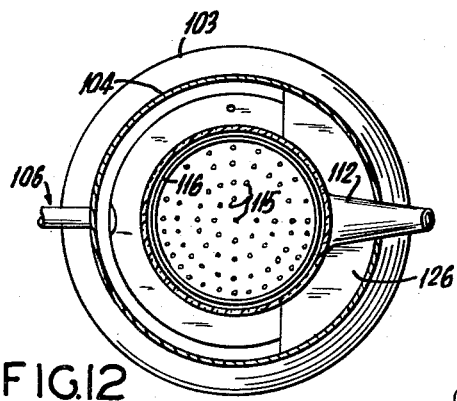
FIG. 12 is a cross-sectional view taken on line 12—12 of FIG. 11.
Figure 13:
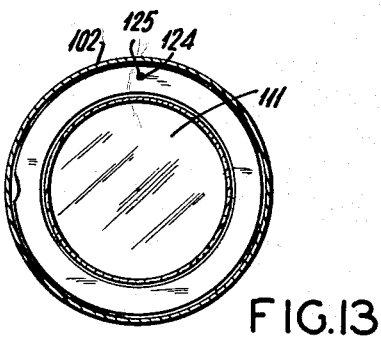
FIG. 13 is a cross-sectional view taken on line 13—13 of FIG. 11.

Referring now in detail to the drawing, 10 designates a coffee maker embodying the invention. The coffee maker 10 may comprise an outer metallic container 11 fitted with a lid 12, and an inner non-metallic container 13. The container 11 may have a bottom wall 14 and a cylindrical upstanding side wall 15 formed with a top edge 15a. It may have a loop handle 16 or other suitable carrying means. The handle 16 comprises two parallel, horizontal portions 17 joined by a vertical portion 18. The handle portions 17 may be fixed to container 11 in any suitable manner. The container 11 may be formed with a bayonet slot 19 for the purpose hereinafter appearing. Said slot 19 comprises a vertical slot portion 20 extending downwardly from top edge 15a at approximately 90° from the position of the handle 16 on the wall 15. Extending from the lower end of the slot portion 20 is a horizontal slot portion 21 offset to one side and having a lower edge 21a and an upper edge 21b.

The lid 12 comprises a top wall 12a (FIG. 3), to which is attached a handle or other hand gripping means 22. Said handle 22 may comprise two parallel vertical portions 23 connected by a top horizontal portion 24. The top wall 12a may comprise a flat, circular portion whose diameter is slightly larger than that of the metal container 11. Said top wall 12a is formed with a central hole 26 covered by a transparent circular plate 27 of glass or other such similar transparent material. Extending downwardly and inwardly from said top wall 12a is shoulder portion 25 resting on edge 15a, and from which extends a short cylindrical skirted wall 28 whose diameter is slightly smaller than the inside diameter of the wall 15. For the purpose hereinafter appearing, a finger extends downward from skirted wall 28 a distance slightly below the horizontal slot portion 21 of said bayonet slot 19. Said finger has a vertical side edge 29 and an inclined side edge 30 which extends downwardly and inwardly toward edge 29. Both edges 29 and 30 terminate at a lower end edge 31 which is parallel to bottom wall 14, and extends below edge 21a of slot 19. Lid or cover 12 may be rotated on container 11 from a position where slot portion 20 is uncovered to a position where said slot portion is covered and only a part of slot portion 21 is uncovered.

Disposed within the metal container 11 and supported in the manner hereinafter appearing, is a non-metallic (glass, ceramic or plastic) container 13. Said container has a bottom wall 32 and an upstanding, cylindrical wall 33 provided with a pouring spout 39 at its upper end. Said inner container 13 is of less length and of smaller diameter than outer container 11. It may be provided with a handle 34 having a downwardly extended gripping section 35 from the upper end of which extends a section 36 passing through slot 19 and sloping downwardly and inwardly to and meeting with said cylindrical wall 33. Section 36 has a groove 36a at its upperside to receive edge 21b of slot portion 20. The handle is located 180° from spout 39 and is fixed to the non-metallic container 13 by any convenient means, such as a metal band 37 encircling the wall 33 below said spout and attached to section 36 by rivets 38. The handle 34 is located at such a height on container 13, that when the coffee maker is assembled, in the manner hereinafter appearing, the lower edge 36a of section 36 rests snugly against lower edge 21a of slot section 21. To place the non-metallic container 13 within the metallic container 11, the portion 36 of handle 34 is first moved down through the vertical section 20 of bayonet slot 19. When the handle is down as far as it can go, the inner container is then rotated to the left, as viewed in FIG. 2 to bring handle portion 34 into slot section 21 of said slot 19. The lid 12 is then placed on the container 11 and positioned (FIG. 2) so that the finger 28a covers slot section 20 and fits snugly against said handle portion 36 to also cover part of slot section 21. Portion 36 is sloped downwardly and inwardly to prevent seepage of water dripping, as will appear hereinafter. Groove 36a engaging edge 21b also aids in this prevention, and serves the additional purpose of preventing the container 13 from tilting due to a buoyancy effect.

Detachably mounted on the bottom wall 14 of container 11 is a stand or platform 40 for support of the inner container 13. Said platform has an upstanding, cylindrical side wall 41, a flanged, ringed inwardly extending annular top wall 42, an inner downwardly extending cylindrical wall 43 of slightly larger diameter than the outside of container 13.

A flat, circular horizontal depressed wall 44, upon which container 13 is supported, extends from the lower end of cylindrical wall 43. Flange 42 is notched at 45 and wall 41 at said notch, extends inwardly and downwardly somewhat more than half its height as at 41a to a point below wall 44, terminating at edge 46. Below said edge is a cutout or opening 47. Flange 42 is formed with a hole 48 angularly spaced from notch 45 for the purpose hereinafter appearing.

Received in the top of container 13 is a coffee ground holding receptacle 50. Said receptacle 50 comprises a lower wall 51 from which extends upwardly a lower cylindrical wall 52 of lesser diameter and disposed within inner container 13, an upwardly and outwardly extending shoulder 53 resting on the upper edge of said inner container, and an upper cylindrical side wall 54 the same diameter as container 13. Wall 54 has a top edge 55. Said wall 51 has a multiplicity of holes 56 to allow brewed coffee to enter container 13.

Mounted on said receptacle 50 and resting on edge 55 of said receptacle, is a cover 57. Said cover 57 comprises a lower wall 58 located below edge 55 and an extended annular flange 59 which goes up, around and down and away from edge 55. Said cover 57 has several holes 60 in its wall 58. Sloping arm 36 of handle 34 prevents seepage outside the container 11, from dripping from conical flange 59.

Connected to platform 40 at hole 48, is an upwardly extending pipe or conduit 61 with a closed top end, perpendicular to flange 42 and extending to a point just above cover 57. At its upper end is a side opening 62 in the pipe from which the boiling water issues forth inwardly onto wall 58.

To make coffee, the various parts are assembled as shown. Then water is introduced in the space 70 between the two containers. By means of the notch 45 and cut out 47, water can occupy the space 71 below the platform. As the water boils, it is forced up through pipe 61 and onto wall 58 of cover 57. It falls through holes 60, through the coffee grounds in receptacle 50 and drops through holes 56, into container 13. Water is continually gravity-fed from space 70 to space 71. After the coffee is fully brewed the lid is removed. The inner container can then be easily removed from the outer container. Receptacle 50 and cover 57 are then removed, and brewed coffee poured directly from the inner container.

FIGS. 8 and 9 illustrate a modified form of coffee ground holding receptacle. The receptacle 50 and lid 57 are replaced by a ribbed wire structure 80 with the same shape as receptacle 50. A flexible sheet filter 81 is placed within structure 80 to contain the grounds. The ribbed device 80 is placed on top of the glass container and has shoulders 83 to fit on top of said container.

FIGS. 11–14 illustrate a modified coffee maker 10a embodying the invention. Coffee maker 10a comprises an outer container 100. Said outer container 100 comprises a bottom wall 101 from which extends upwardly a short, cylindrical wall 102 and from which extends a bulged annular wall 103. Extending up from bulged portion 103 is a cylindrical portion 104 provided with a bayonet slot 105 located 180° from a handle 106. Slot 105 has a vertical section 105a and a horizontal section 105b. Handle 106 may be similar to handle 16. On top of container 100 is a lid 107 similar to lid 12, including a finger 108 similar to finger 28a, except that the top wall 109 of the lid has a slightly spherical shape. Within the outer container is a non-metallic inner container 110 which has a bottom wall 111 and an upwardly extending cylindrical wall 111a provided with a top edge 111b. Located near the upper end of cylindrical wall 111 is a spout 112 which passes through bayonet slot 105 in wall 104. Received in the top of container 110 is a coffee ground holding receptacle 113 comprising a bottom wall 114 formed with a multiplicity of holes 115. Extending up from wall 114 is a cylindrical wall 116. Wall 116 is formed with holes 116a. The outer diameter of wall 116 is less than the inner diameter of wall 111a to provide a space to allow brewed coffee to drop into said container 110. Said receptacle 113 has a shoulder 117 to rest on the upper edge of inner container 110. Another cylindrical wall 118 extends up from shoulder 117. Wall 118 has a top edge 118a. Wall 116 is deeper than wall 118.

Mounted on top of receptacle 113 is a cover 119 with a depressed bottom wall 120 containing holes 121 and located below edge 118a. Extending from the wall 120 is a flange 122 which goes up and over edge 118a, and down alongside of wall 118.

Container 110 is mounted on a platform 123 which is exactly like platform 40, except that it is of lesser diameter to facilitate removal and positioning. Its top flange has a hole 124 which receives the lower end of pipe 125 which is exactly like pipe 61.

Attached to the inside of wall 104 of the outer container 100 and positioned just below the attachment of spout 112 to wall 111a of the inner container 110, is a partial annular flange 126. The purpose of this flange is to keep the inner container firmly in position when acted upon by forces due to the buoyancy effect created when water is introduced into the chambers between the inner and outer containers.

Flange 126 also serves to prevent tilting sideways of the inner container when the pot is close to horizontal position when pouring. Another purpose of flange 126 is to provide a seal preventing excess water from below the flange, from reaching opening 105 during pouring.

Figure 14:
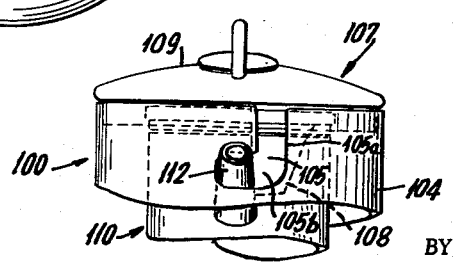
FIG. 14 is a partial front view of the upper end of the coffee pot shown in FIG. 11.

The coffee maker 10a is used in the same manner as previously described, except the inner container is placed into position by passing the spout 112 down through the vertical section 105a of slot 105 as far as it can go and is then rotated to the left, as viewed in FIG. 14 into horizontal section 105b of slot 105. The lid 107 is then placed on container 100 and is positioned so that finger 108 covers section 105a and fits snugly against spout 112. Furthermore, the container is not removed after brewing, and pouring is accomplished by use of the handle 106. The purpose of the bulge in wall 103 is to prevent any excess water beneath platform 123 from dripping out the slot 105 during the pouring operation.

It will thus be seen that there is provided an apparatus in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative and not in a limiting sense.

I claim:

1. A coffee maker comprising an outer container having a bottom wall, and an upstanding wall, a support means removable from within the outer container, an inner container open at the top and removably mounted on said support means, said support means having means to retain the lower end of said inner container in spaced condition above the bottom wall and spaced from said upstanding wall of said outer container, and being formed with means to establish communication between the space beneath said inner container and the space between the inner container and the upstanding wall of the outer container, a coffee ground holder removably supported on the upper open end of said inner container, conduit means unconnected to said inner container, to bring liquid from the space beneath said inner container to the top of said holder, means within said outer container to support said conduit means, said holder having openings in its lower end to allow brewed coffee to pass therethrough down into said inner container, and said inner container being imperforate below its upper end, whereby brewed coffee will remain in said inner container, and said inner container being removable from said outer container, with said conduit means remaining within said outer container, a handle for said outer container, means to releasably retain said inner container down on said support means, and means on the outer container to retain the upper end of said inner container against sideways movement, said means to releasably retain said inner container down on said support means comprising a bayonet slot formed in said outer container, said slot having a vertical portion extending down from the upper end of the upstanding wall of said outer container, and a horizontal portion offset from the lower end of said vertical portion, and means fixed to said inner container and extending therefrom and movable down through said vertical portion of the slot, said inner container being rotatable to move said extending means fixed on said inner container, into said horizontal portion of the slot, with said inner container resting on said support means.

2. The combination of claim 1, and a cover removably mounted on said outer container and having a portion covering at least part of the vertical portion of said slot.

3. The combination of claim 1, said extending means comprising a spout on said inner container.

4. The combination of claim 1, said support means comprising a platform formed with a central recess receiving the lower end of said inner container.

5. The combination of claim 1, said conduit means being mounted on said support means.

6. The combination of claim 1, and said means to retain said upper end of said inner container against sideways movement comprising a flange fixed to the front inner upper side of said outer container and having an inner edge partially surrounding and engaging the inner container nearer to the upper end of the latter than to the lower end of the latter.

7. The combination of claim 1, said extending means on the inner container comprising a handle fixed to said inner container.

8. The combination of claim 7, said means to retain the upper end of said inner container against sideways movement comprising a groove in said last handle, receiving an edge portion of said outer container.

References Cited in the file of this patent
UNITED STATES PATENTS

| | | |
|---|---|---|
| 523,344 | Hancock | July 24, 1894 |
| 544,140 | Van Deusen | Aug. 6, 1895 |
| 1,504,500 | Pizzoglio | Aug. 12, 1924 |
| 1,952,752 | Haines | Mar. 27, 1934 |
| 2,467,817 | Dietz | Apr. 19, 1949 |
| 2,654,306 | Sacker | Oct. 6, 1953 |

FOREIGN PATENTS

| | | |
|---|---|---|
| 7,637 | Switzerland | Dec. 13, 1893 |